(12) United States Patent
Smith et al.

(10) Patent No.: US 8,048,319 B2
(45) Date of Patent: Nov. 1, 2011

(54) FILTER MEDIUM FOR STRAINERS USED IN NUCLEAR REACTOR EMERGENCY CORE COOLING SYSTEMS

(75) Inventors: James Aaron Smith, Lilburn, GA (US); Atul Harihar Patel, Acworth, GA (US); Louis Thomas Carr, Jr., Madison, AL (US)

(73) Assignee: Enercon Services, Inc., Tulsa, OK (US)

( * ) Notice: Subject to any disclaimer, the term of this patent is extended or adjusted under 35 U.S.C. 154(b) by 128 days.

(21) Appl. No.: 12/568,327

(22) Filed: Sep. 28, 2009

(65) Prior Publication Data
US 2010/0025315 A1 Feb. 4, 2010

Related U.S. Application Data

(62) Division of application No. 12/465,253, filed on May 13, 2009.

(51) Int. Cl.
*G21C 15/18* (2006.01)
*B01D 29/13* (2006.01)

(52) U.S. Cl. .................. 210/767; 210/167.01; 210/196; 210/251; 210/315; 210/416.1; 210/484; 210/489; 210/499; 210/232; 376/282; 376/313

(58) Field of Classification Search .................. None
See application file for complete search history.

(56) References Cited

U.S. PATENT DOCUMENTS

| 1,140,726 | A | | 5/1915 | Warden | |
|---|---|---|---|---|---|
| 2,442,818 | A | | 6/1948 | Lyman | |
| 2,925,650 | A | * | 2/1960 | Pall | 29/896.62 |
| 3,049,796 | A | * | 8/1962 | Pall | 428/596 |
| 3,156,950 | A | * | 11/1964 | Walton, Jr. | 425/464 |
| 3,329,276 | A | * | 7/1967 | Mouwen | 210/487 |
| 3,458,047 | A | * | 7/1969 | White | 210/282 |
| 3,690,606 | A | * | 9/1972 | Pall | 428/605 |
| 3,708,965 | A | * | 1/1973 | Domnick | 55/488 |
| 3,780,872 | A | * | 12/1973 | Pall | 210/493.1 |
| 3,879,286 | A | * | 4/1975 | Berriman | 210/780 |
| 4,280,906 | A | | 7/1981 | Liljegren | |
| 4,331,460 | A | | 5/1982 | Dillmann et al. | |
| 4,358,371 | A | * | 11/1982 | Jameson et al. | 210/415 |
| 4,376,091 | A | | 3/1983 | Netkowicz et al. | |
| 4,597,871 | A | | 7/1986 | Okouchi et al. | |
| 4,744,806 | A | * | 5/1988 | Ozolins et al. | 95/273 |
| 4,909,937 | A | | 3/1990 | Hoffmann et al. | |
| 5,053,122 | A | | 10/1991 | Carr | |
| 5,345,483 | A | | 9/1994 | Johansson et al. | |
| 5,390,221 | A | | 2/1995 | Dix et al. | |
| 5,426,679 | A | | 6/1995 | Henriksson | |
| 5,453,180 | A | | 9/1995 | Henriksson | |

(Continued)

*Primary Examiner* — Robert James Popovics
(74) *Attorney, Agent, or Firm* — Molly D. McKay

(57) ABSTRACT

A filter medium for strainers used in the emergency sump of a nuclear power plant ECCS. The filter medium is employed with double wall, concentric tube type strainer modules. The filter medium is preferably constructed of a woven or knitted stainless steel wire material and is shaped in a cylinder so that it can be inserted between two concentric strainer walls, concentric tube type strainer in such a manner that water that passes through the strainer must pass through and be filtered by the filter medium before the water can be pumped to the reactor core. The filter medium is inserted through the bottom of the strainer module and is held in place by an x-shaped retainer. The filter creates varied approach velocity of the fluid and results in non-uniform fibrous debris accumulation on the strainer, insuring acceptable strainer debris hydraulic head loss.

4 Claims, 7 Drawing Sheets

U.S. PATENT DOCUMENTS

| | | |
|---|---|---|
| 5,478,469 A | 12/1995 | Bryan et al. |
| 5,496,468 A | 3/1996 | Cormier |
| 5,539,790 A | 7/1996 | Henriksson |
| 5,612,983 A | 3/1997 | Henriksson et al. |
| 5,640,434 A | 6/1997 | Rottenberg |
| 5,664,628 A * | 9/1997 | Koehler et al. ............... 166/369 |
| 5,688,402 A | 11/1997 | Green et al. |
| 5,696,801 A | 12/1997 | Dwyer et al. |
| 5,705,054 A * | 1/1998 | Hyrsky .......................... 210/109 |
| 5,711,872 A * | 1/1998 | Jones et al. ................... 210/130 |
| 5,736,044 A * | 4/1998 | Proulx et al. ................. 210/488 |
| 5,759,398 A * | 6/1998 | Kielbowicz ............... 210/416.1 |
| 5,759,399 A * | 6/1998 | Bilanin et al. ............. 210/416.1 |
| 5,815,544 A * | 9/1998 | Lefter ........................... 376/313 |
| 5,835,549 A * | 11/1998 | Sibiga ........................... 376/313 |
| 5,843,314 A | 12/1998 | Dwyer et al. |
| 5,873,999 A * | 2/1999 | Gaiser ........................... 210/488 |
| 5,935,439 A | 8/1999 | Hart et al. |
| 5,958,234 A | 9/1999 | Dwyer et al. |
| 6,106,592 A | 8/2000 | Paranjpe et al. |
| 6,254,774 B1 | 7/2001 | Henderson |
| 6,387,261 B1 | 5/2002 | Mojena |
| 6,477,220 B1 | 11/2002 | Wivagg |
| 6,488,842 B2 | 12/2002 | Nagaoka |
| 6,491,818 B2 | 12/2002 | Dwyer et al. |
| 6,709,586 B2 | 3/2004 | Mason |
| 7,027,549 B2 | 4/2006 | Hemmi et al. |
| 7,081,201 B2 | 7/2006 | Bassett et al. |
| 7,211,190 B2 | 5/2007 | Kielbowicz |
| 2001/0027945 A1* | 10/2001 | Sauerbrun ..................... 210/490 |
| 2001/0032815 A1* | 10/2001 | Adams et al. ................. 210/388 |
| 2002/0020678 A1 | 2/2002 | Loreno |
| 2002/0057755 A1 | 5/2002 | Hemmi et al. |
| 2002/0079263 A1* | 6/2002 | Schulte et al. ............... 210/388 |
| 2002/0148766 A1 | 10/2002 | Dwyer et al. |
| 2004/0206679 A1 | 10/2004 | Bleigh |
| 2004/0206682 A1 | 10/2004 | Hamlin et al. |
| 2005/0167355 A1 | 8/2005 | Kielbowicz |
| 2005/0284823 A1* | 12/2005 | Fall et al. ...................... 210/767 |
| 2006/0027492 A1 | 2/2006 | Lin |
| 2006/0049096 A1 | 3/2006 | Bassett et al. |
| 2006/0219645 A1 | 10/2006 | Bilanin et al. |
| 2007/0045166 A1 | 3/2007 | Fanning et al. |
| 2007/0084782 A1* | 4/2007 | Smith et al. ................. 210/323.2 |
| 2007/0289915 A1 | 12/2007 | Jiang et al. |
| 2010/0025315 A1* | 2/2010 | Smith et al. .................. 210/232 |

* cited by examiner

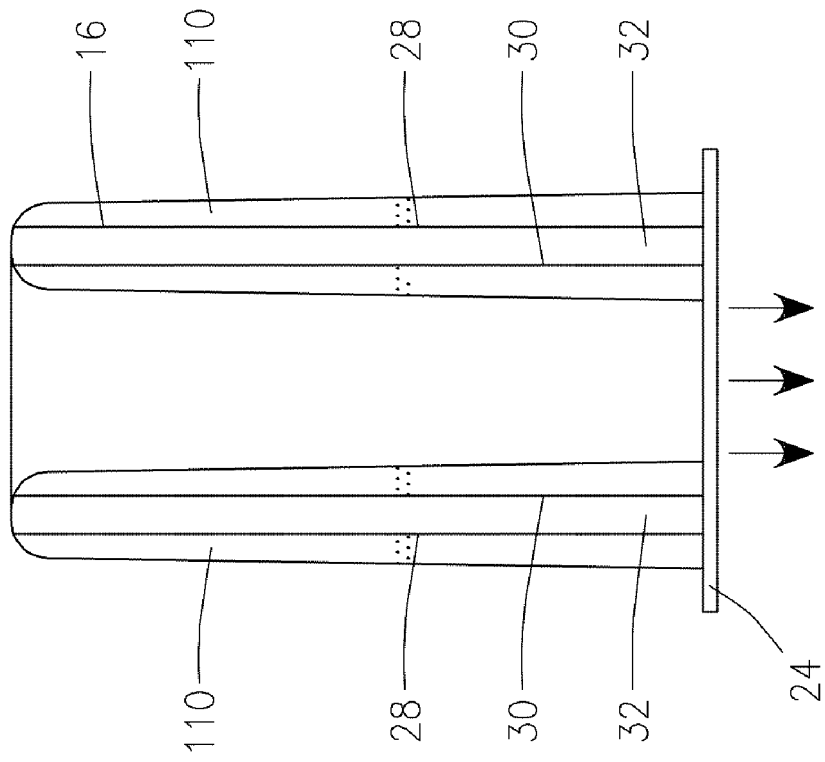
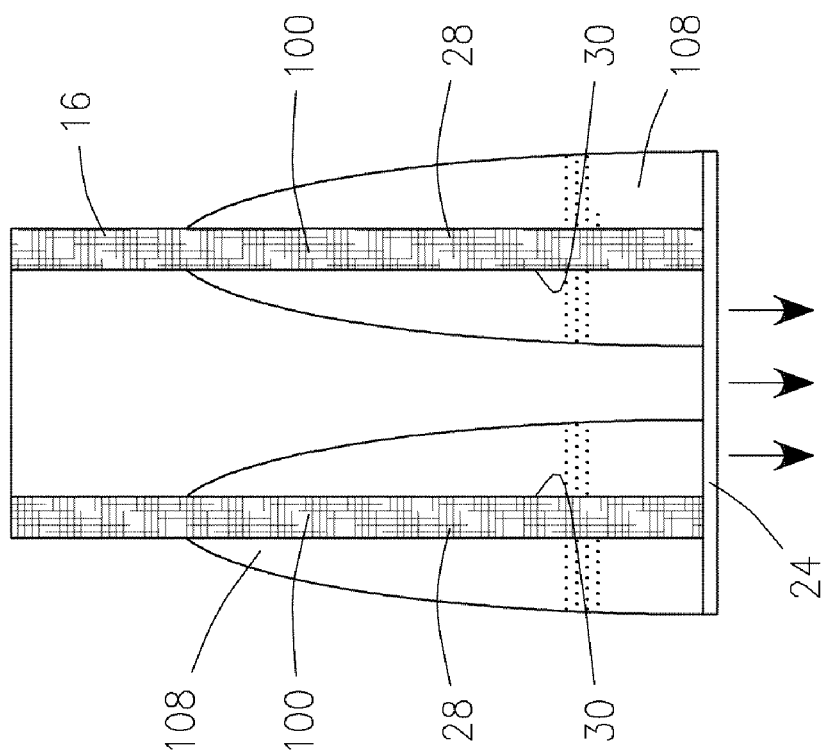

FILTER MEDIUM FOR STRAINERS USED IN NUCLEAR REACTOR EMERGENCY CORE COOLING SYSTEMS

CROSS-REFERENCE TO RELATED APPLICATIONS

The present application is a divisional application of U.S. patent application Ser. No. 12/465,253 filed on May 13, 2009 for Filter Medium for Strainers Used in Nuclear Reactor Emergency Core Cooling Systems which in turn claims priority to U.S. patent application Ser. No. 11/243,637 filed on Oct. 5, 2005 for Filter Medium for Strainers Used in Nuclear Reactor Emergency Core Cooling Systems.

BACKGROUND OF THE INVENTION

1. Field of the Invention

The present invention relates to a filter medium that is used in conjunction with concentric tube type strainers used in emergency core cooling systems (ECCS) of nuclear power plants. Specifically, the present invention is a woven or knitted stainless steel filter medium that is inserted between an external and an internal double wall concentric tube type strainer and through which water must pass and be filtered after the water passes through the strainer and before the water can be pumped to the reactor core. This filter medium alters the approach velocity of the water at the strainer surface resulting in non-uniform fibrous debris accumulation on the strainer surface which better insures acceptable strainer debris hydraulic head loss.

2. Description of the Related Art

The containment sump, which is also known as the emergency or recirculation sump, is part of the Emergency Core Cooling System or ECCS of a nuclear power plant. The ECCS is one of several safety systems required by the Nuclear Regulatory Commission or NRC in every nuclear power plant constructed in the United States. The ECCS is required in order to mitigate a design basis accident.

The containment sump collects reactor coolant and chemically reactive spray solutions following a loss-of-coolant-accident or LOCA. The containment sump serves as the water source to support long-term recirculation for the functions of residual heat removal, emergency core cooling, and containment atmosphere cleanup. Thus this water source and related equipment are important safety components of the nuclear power plant.

Typically, the containment sump is surrounded by a debris strainer to prevent debris from entering the ECCS suction lines. The strainer is constructed with a plurality of perforated strainer modules that serve to strain and filter out fibrous and particulate debris and other material from recirculation water that enters the nuclear power plant containment sump during an emergency core cooling event. It is important to filter out this debris from the water before the water passes into the pumps of the ECCS. Debris can block or restrict flow through the openings in the strainer or, if allowed to pass through the strainer and into the pumps of the ECCS, can damage the ECCS pumps and components in the systems served by the ECCS pumps such as the reactor.

The present invention reduces or eliminates debris and other material that potentially passes through the strainers used in nuclear power plant containment sumps. For a typical strainer, debris quantities that can bypass or pass through the openings of the emergency strainers are typically on the order of five percent or more of the total debris and material that deposits onto the strainer surface. Thus a significant amount of debris typically will pass through the strainer. The amount of debris and material passing through the strainer has been shown to have potentially adverse affects on equipment and components downstream of the strainer. This can include excessive wear, plugging, blockage, fouling, etc. This can result in equipment failure, decreased equipment life, clogging of the reactor fuel cooling paths, etc. Hence the purpose of the present invention is to reduce or eliminate the bypassing of debris and material in order to minimize or eliminate adverse affects on downstream equipment and components.

The nuclear power industry has not employed any type of filter medium in association with the strainers that could become clogged because this could result in loss of head pressure, cause loss of suction on the pumps resulting in cavitation, and thereby preventing the flow of cooling water to the reactor. Thus, the addition of filter medium to the strainers goes against current practice in the industry.

The present invention consists of the primary strainer device, which is typically constructed of perforated stainless steel, coupled with a custom designed filter medium insert of stainless steel knitted or woven wire mesh. The drawings that are attached depict a particular perforated strainer design and utilize a cylindrical knitted wire mesh shape filter medium to act as the secondary filter. However, the filtering medium can be produced in various shapes and configurations for use with different strainer configurations.

The knitted or woven wire mesh filter medium is customized by using various diameters, densities, crimping styles, and configurations to optimize the reduction of bypassed debris and other material for each particular application. The knitted or woven wire mesh is located inside of or on the downstream side of the primary strainer and, as such, serves as a secondary filtering medium, with the strainer serving the primary filtering function. The debris straining effect of the primary strainer combines with the secondary filter to produce a system that greatly reduces bypassed debris and other material potentially encountered during recirculation operation of the ECCS and it does so with no significant increase in fluid pressure drop across the combination strainer and filter.

The combination strainer and filter of the present invention produces two physical factors that reduce or eliminate the bypassing of debris and other material. The first is bypass resistance and the second is entrapment of the debris or other material on the filter medium.

Bypass resistance is the physical resistance to debris and other material from passing through openings in the primary strainer. Use of the knitted or woven wire mesh secondary filter medium in combination with the strainer causes an increase in bypass resistance associated with the primary strainer. This bypass resistance factor tends to cause a significant fraction of the debris and other material that may otherwise pass through the primary strainer to remain on the upstream surface of the primary strainer.

For debris and other material that manages to pass through the openings in the primary strainer, the knitted or woven wire mesh secondary filter medium entraps most, if not all, of the remaining debris and other material within the convoluted wire mesh structure, and thus prevents it from passing into the downstream flow of cooling water traveling to the ECCS pumps.

The present invention is designed to function as a totally passive device without requiring electrical power, periodic replacement, or human intervention or operation, other than periodic inspections approximately once every 18 to 24 months. The use of stainless steel material for the filter medium will ensure the present invention has long term functionality, will not be affected by corrosive conditions, and can remain submerged in the containment water conditions expected following a postulated LOCA.

As discussed in U.S. Nuclear Regulatory Commission (NRC) Regulatory Guide 1.82, Revision 3, "Water Sources for Long Term Recirculation Cooling Following a Loss-of-Coolant Accident", an emergency core cooling recirculation strainer system needs to be designed and evaluated to address a "thin bed" of fibrous debris. It is commonly known from industry testing that this "thin bed" of fibrous debris combined with a large particulate debris load can result in significant clogging and blockage of water flow through the strainer system. A desired feature of the strainer system is for the strainer system to accumulate or "load" fibrous debris in a non-uniform debris pattern. A thin uniform layer of fibrous debris combined with particulate debris can produce significant blockage.

However, if the fibrous debris accumulates thicker in one area and thinner in another area, the blockage of water flow will be less, resulting in less hydraulic head loss through the strainer system.

The present invention enhances the non-uniform fibrous debris accumulation on the surface of the strainer. In addition to the secondary filtering capabilities of the present invention, the knitted woven wire mesh filter provides an internal flow resistance medium within the strainer. The water flow path is first through the strainer surface, then through the filter medium and finally into the general flow stream to the suction of the emergency core cooling system. This flow path, which passes radially through the filter medium along the length of the strainer, produces an increasing pressure drop of the fluid until exiting the strainer into the general flow stream. This increasing pressure drop results in a varied approach velocity of the bulk fluid to the strainer surface such that the approach velocity is higher at the base of the strainer and lower at the end of the strainer. This varied approach velocity of the bulk fluid results in fibrous debris accumulating in a pattern of a thicker debris bed accumulation at the base of the strainer tapering to a thinner debris bed at the end of the strainer. This non-uniform debris accumulation feature enhances the present invention's ability to accommodate "thin bed" fibrous debris loads to better insure acceptable strainer debris hydraulic head loss.

SUMMARY OF THE INVENTION

The present invention is a filter medium for strainers used in the emergency core cooling system of nuclear power plants. The filter medium is used in conjunction with double wall, concentric tube type strainer modules. The filter medium is preferably constructed of a woven or knitted stainless steel wire material and is shaped in a cylinder so that it can be inserted between an external and an internal strainer of a double wall, concentric tube type strainer in such a manner that water that passes through the strainer must pass through and be filtered by the filter medium before the water can be pumped to the reactor core.

The knitted woven wire mesh filter provides an internal flow resistance medium within the strainer that creates a varied approach velocity of the bulk fluid to the strainer surface. This varied approach velocity promotes non-uniform fibrous debris accumulation on the surface of the strainer. This non-uniform debris accumulation feature enhances the present invention's ability to accommodate "thin bed" fibrous debris loads to better insure acceptable strainer debris hydraulic head loss.

The cylindrical filter medium is held in position between the two strainers of each double wall concentric tube type strainer typically by an x-shaped retainer.

BRIEF DESCRIPTION OF THE DRAWINGS

FIG. 10 is a diagram similar to FIG. 9 showing the non-uniform debris bed that is formed on the surfaces of the strainer module in association with the present invention.

FIG. 11 is a diagram of the prior art filter concentric tube type strainer of FIG. 3 showing the more uniform debris bed that is formed on the surfaces of the strainer in association with prior art strainers.

DETAILED DESCRIPTION OF THE PREFERRED EMBODIMENT

Prior Art

Figure 1:
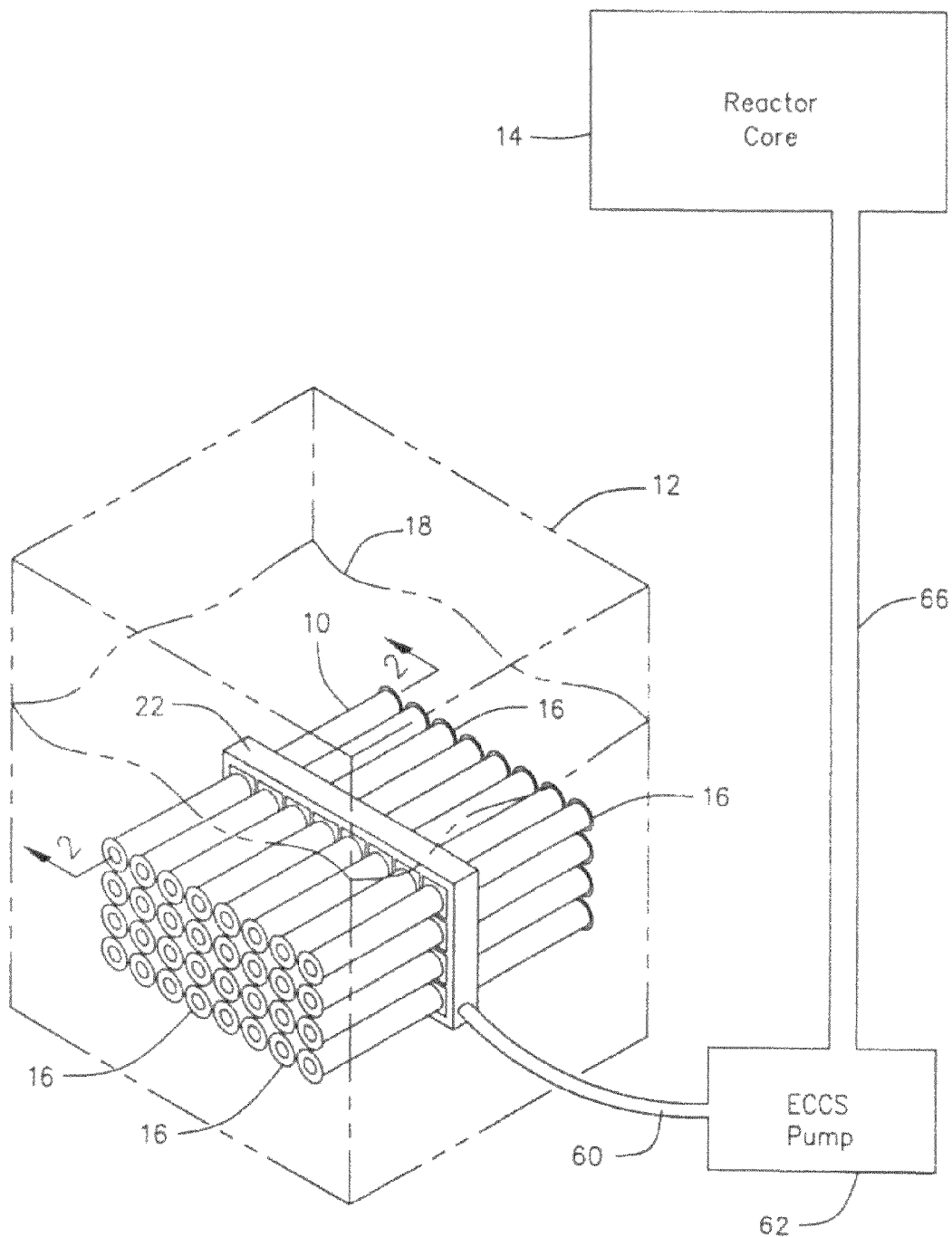
FIG. 1 is a diagram showing the prior art relationship of concentric tube type strainers employed in a nuclear plant ECCS sump.
Figure 2:
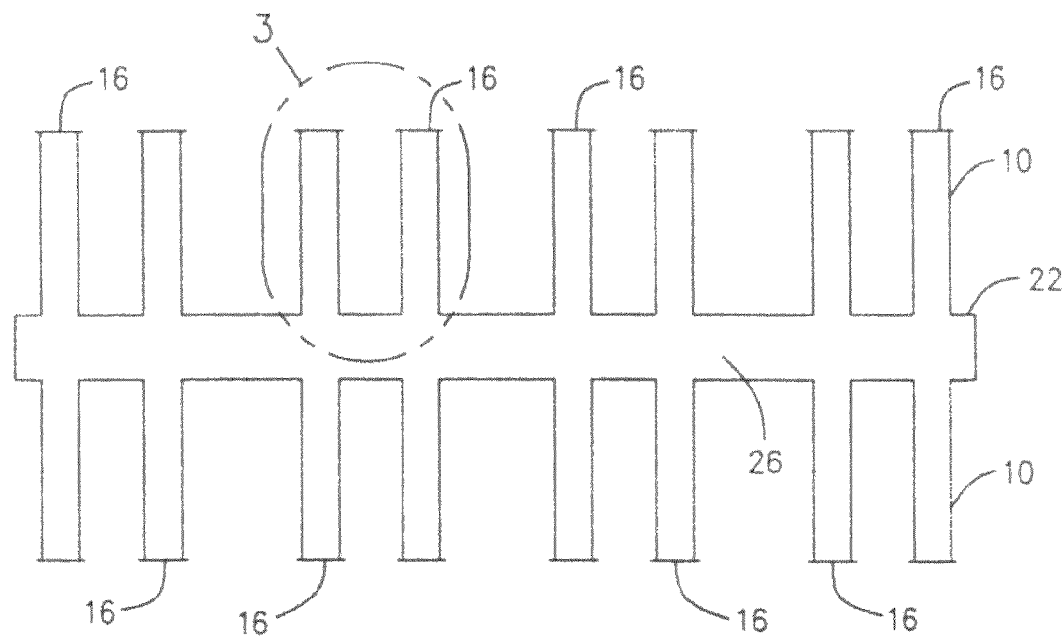
FIG. 2 is a cross sectional view of several prior art concentric tube type strainers taken along line 2-2 of FIG. 1.
Figure 3:
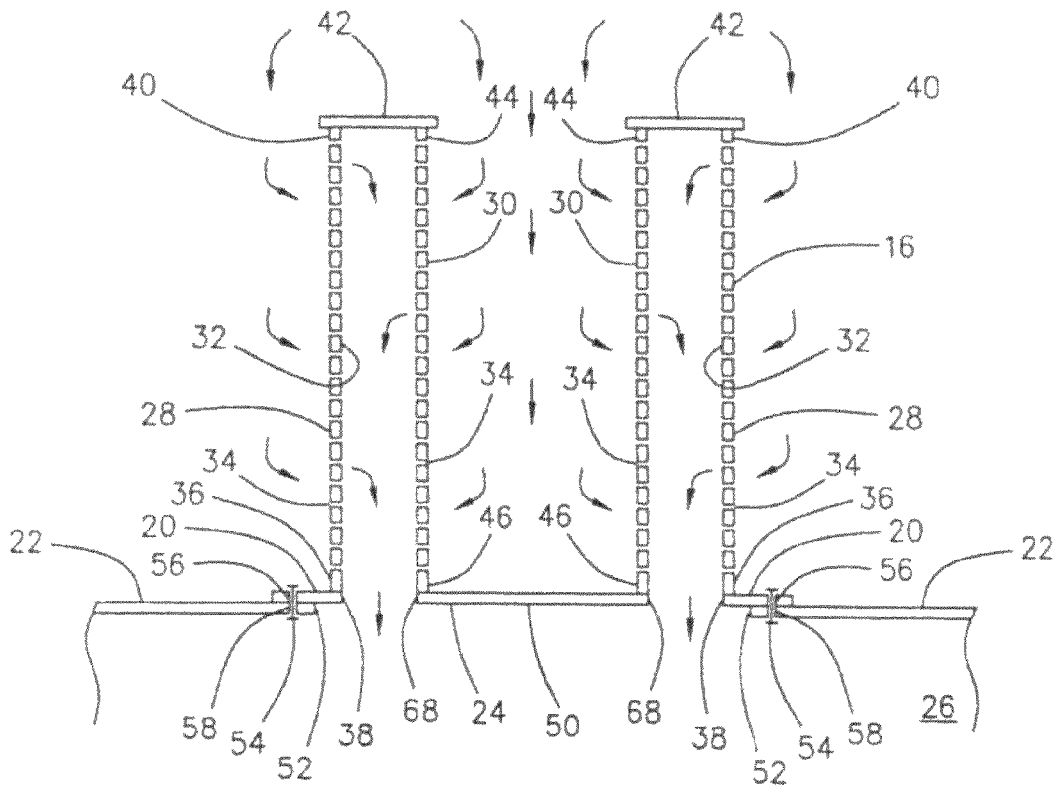
FIG. 3 is an enlarged view of a concentric tube type strainer located within circle 3 of FIG. 2 showing the flow pattern of water passing through the strainer.

Referring now to the drawings and initially to FIGS. 1, 2, and 3, there is illustrated a prior art installation of a concentric tube type strainer 10 in a containment emergency sump 12 in association with a reactor core 14 of a nuclear power plant. As illustrated in FIG. 1, the sump 12 is a part of the Emergency Core Cooling System or ECCS for the nuclear power plant. The ECCS functions to collect chemically reactive spray solutions and reactor coolant, normally in the form of water, in the sump 12 following a loss-of-coolant-accident or LOCA. The ECCS also functions to strain out large debris from the water and to recirculate that strained water to the reactor core 14 to prevent the core 14 from overheating.

As shown in FIG. 1 and in more detail in FIGS. 2 and 3, the strainer 10 is provided with a plurality of concentric tube type strainer modules 16 that are located under the water level 18 within the sump 12. Each strainer module 16 attaches via its bottom flange 20 to a plenum box 22 so that the bottom or downstream side 24 of the strainer module 16 is in liquid communication with an interior cavity 26 of the plenum box 22 as will be more fully described hereafter. Each concentric tube type strainer module 16 is provided with two strainer walls: a first cylindrical strainer wall 28 and a second cylindrical strainer wall 30. The first and second walls 28 and 30 are spaced apart so that a cylindrical interior space 32 is formed between the double walls 28 and 30 within each module 16 on the downstream side of its walls 28 and 30. Both the first and second strainer walls 28 and 30 are preferably constructed of perforated stainless steel cylinders. As illustrated in FIG. 3, the perforations 34 provided in the walls 28 and 30 are typically in the size range of 1/16 to 1/4 inch in diameter. A lower edge 36 of the first strainer 28 for each module 16 is attached to the bottom flange 20 at a circular opening 38 provided in the flange 20, and an upper edge 40 of the first strainer 28 in attached to a top sealing ring 42. An upper edge 44 of the second strainer 30 in also attached to the top sealing ring 42, and a lower edge 46 of the second strainer 30 is attached at a periphery 48 of a circular bottom plate 50.

The circular bottom plate 50 and the bottom flange 20 are located in approximately the same plane. The circular bottom plate 50 is located within the circular opening 38 provided in the bottom flange 20 and spaced apart from the bottom flange 20 so that the cylindrical interior space 32 is continuous to the bottom 24 of the module 16. As illustrated in FIG. 3, the bottom flange 20 of each module 16 attaches to the plenum box 22 at an associated plenum box opening 52 via bolts 54 that extend through bolt openings 56 and 58 provided in respectively in the bottom flange 20 and the plenum box 22. When the module 16 is thus attached to the plenum box 22, the cylindrical interior space 32 of the module 16 is in liquid communication with the interior cavity 26 of the plenum box 22. Thus, when the concentric tube type strainer 10 is assembled, water located in the sump 12 must flow through and be strained by one of the perforated strainer walls 28 or 30 in order to enter the plenum box 22.

As shown by the arrows in FIG. 3 which depict the flow path of the water through a module 16, water from the sump 12 flows around each strainer module 16 and passes through either the first or second perforated cylindrical wall 28 or 30 into the cylindrical interior space 32 provided between the two wall 28 and 30. The strained water then passes out of the cylindrical interior space 32 at the bottom 24 of the module 16 and into the interior cavity 26 of the plenum box 22 with which the cylindrical interior space 32 communicates.

From here, as illustrated in FIG. 1, the water then flows via a water suction line 60 to the Emergency Core Cooling System or ECCS pump 62 which delivers the water to the reactor core 14 via a water discharge line 66.

The Invention

FIGS. 4, 5, 6, 7, 8 and 9 illustrate a filter medium 100 for use in conjunction with strainers 10 used in ECCS of nuclear power plants. The filter medium 100 is constructed in accordance with a preferred embodiment of the present invention. The filter medium 100 is preferably constructed of woven or knitted stainless steel wire mesh that has been formed into a cylinder so that it can be inserted into the interior space 32 provided between the two walls 28 and 30 of a strainer module 16 and completely fills that interior space 32. The filter medium 100 is inserted in the interior space 32 in such a manner that water that passes through the walls 28 or 30 of the strainer module 16 must also pass through and be filtered by the filter medium 100 before the water can be pumped to the reactor core 14.

Figure 4:
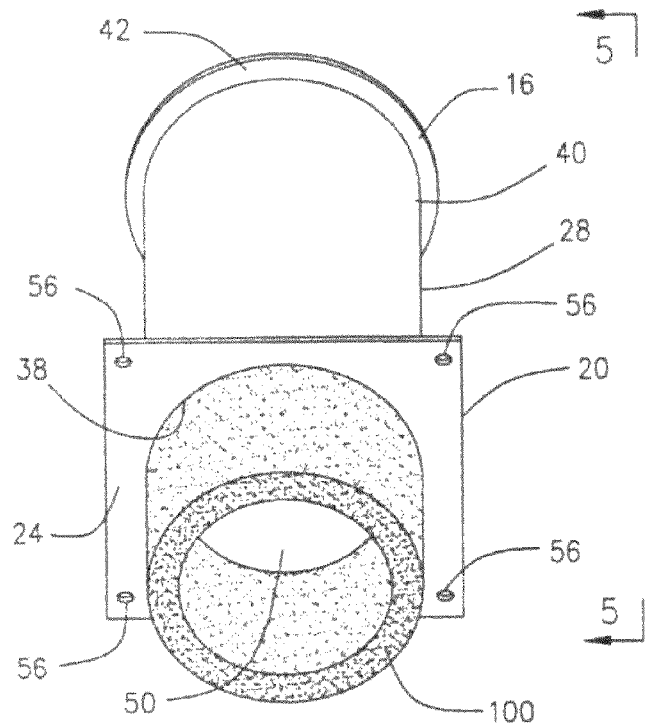
FIG. 4 is a bottom perspective view of a concentric tube type strainer with a filter according to the present invention being inserted into the strainer from the bottom of the strainer and with the retention means removed from the strainer for clarity.

FIG. 4 illustrates a filter medium 100 being inserted into an interior space 32 of a strainer module 16 via a ring-shaped opening 68 provided at the bottom 24 of the module 16. The ring-shaped opening is located between the opening 38 in the bottom flange 20 and the circular bottom plate 50 and is where the interior space 32 of the module 16 joins with the interior cavity 26 of the plenum box 22.

Figure 9:
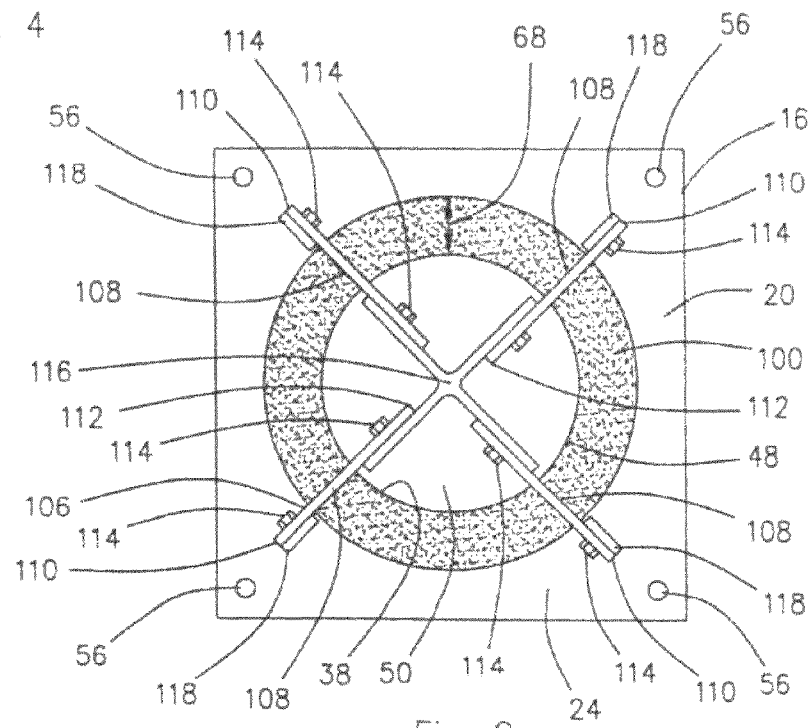
FIG. 9 is a bottom plan view of the strainer with filter taken along line 9-9 of FIG. 6 showing the retention means for holding the filter within the strainer.
Figure 5:
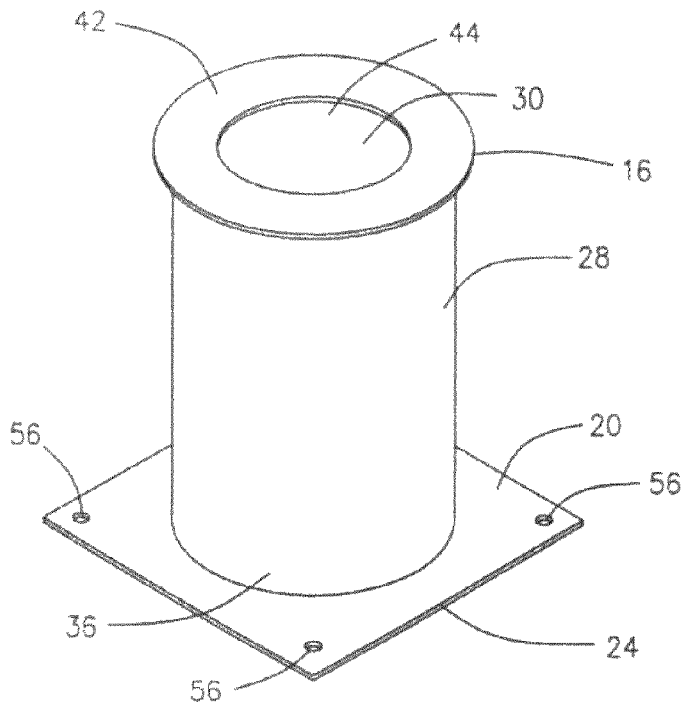
FIG. 5 is a top perspective view of a concentric tube type strainer with filter constructed in accordance with a preferred embodiment of the present invention.
Figure 6:
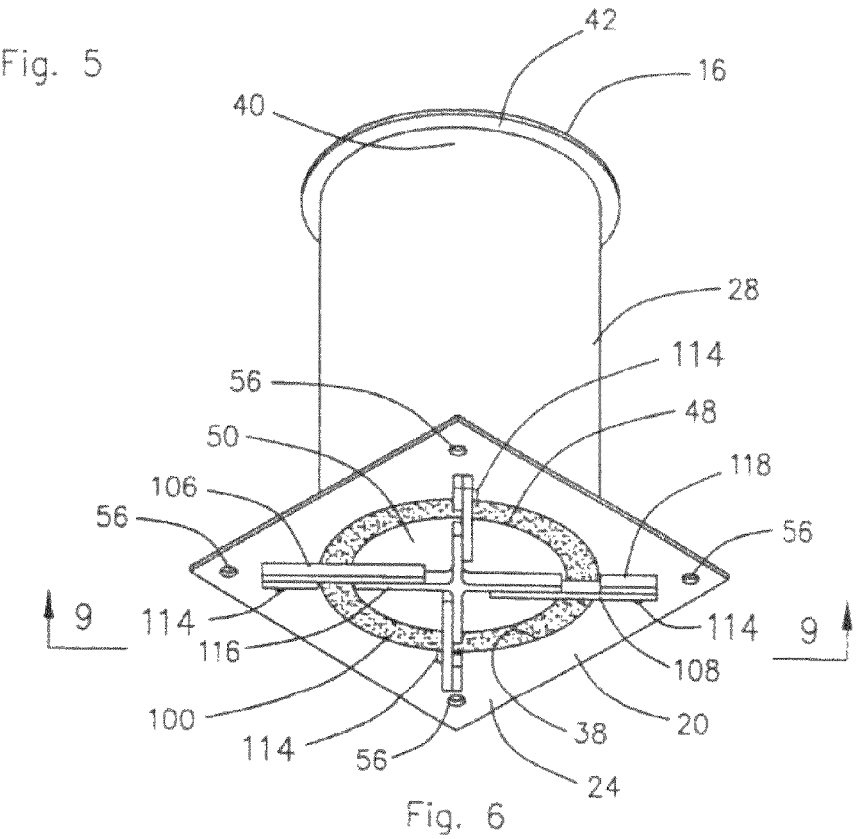
FIG. 6 is a bottom perspective view of the concentric tube type strainer with filter shown in FIG. 5.

As illustrated in FIGS. 3, 5 and 6, once the filter medium 100 has been fully inserted into the strainer module 16, a top 102 of the filter medium 100 abuts the top sealing ring 42 and a bottom 104 of the filter medium 100 is approximately flush with the bottom 24 of the strainer module 16. As illustrated in FIG. 9, an x-shaped retention means 106 is provided attached to the strainer module 16 and designed for holding the filter medium 100 within the strainer module 16.

Figure 7:
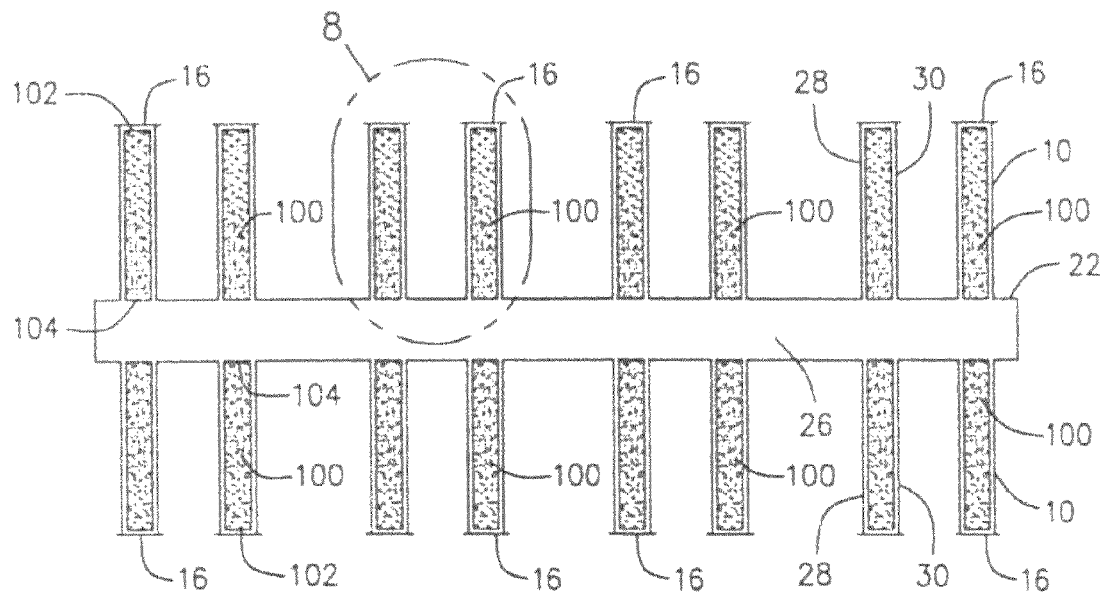
FIG. 7 is a cross sectional view similar to FIG. 2 showing concentric tube strainers with filters as they would appear when installed in a sump.
Figure 8:
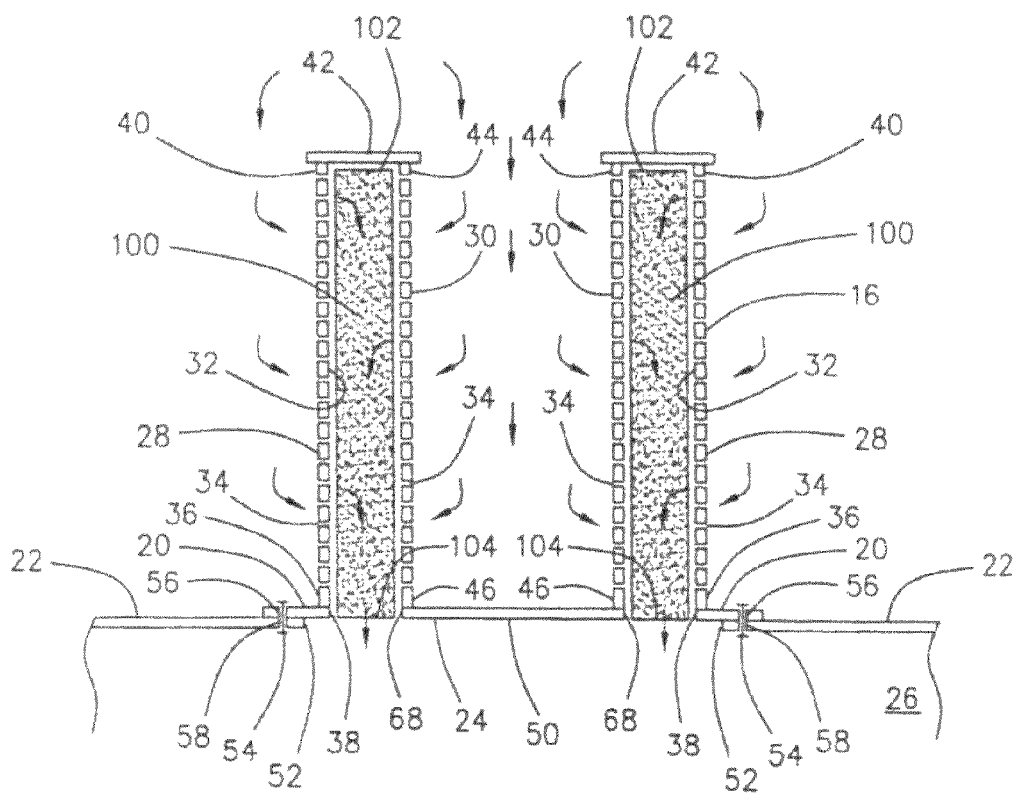
FIG. 8 is an enlarged view of a concentric tube type strainer with filter located within circle 8 of FIG. 7 with retention means removed and showing the flow pattern of water passing through the strainer with filter.

As illustrated in FIGS. 7 and 8, the flow pattern for water through the strainer 10 and filter 100 of the present invention is no different from that illustrated in FIGS. 2 and 3 for the prior art strainer 10 except that in the present invention the water flows through the filter medium 100 that is located in the interior space 32 of the strainer module 16 before entering the plenum box 22. Addition of filter medium 100 to the existing strainer modules 16 does not adversely affect the head pressure in the water suction line 60 that delivers water to the ECCS pump 62.

Figure 12:
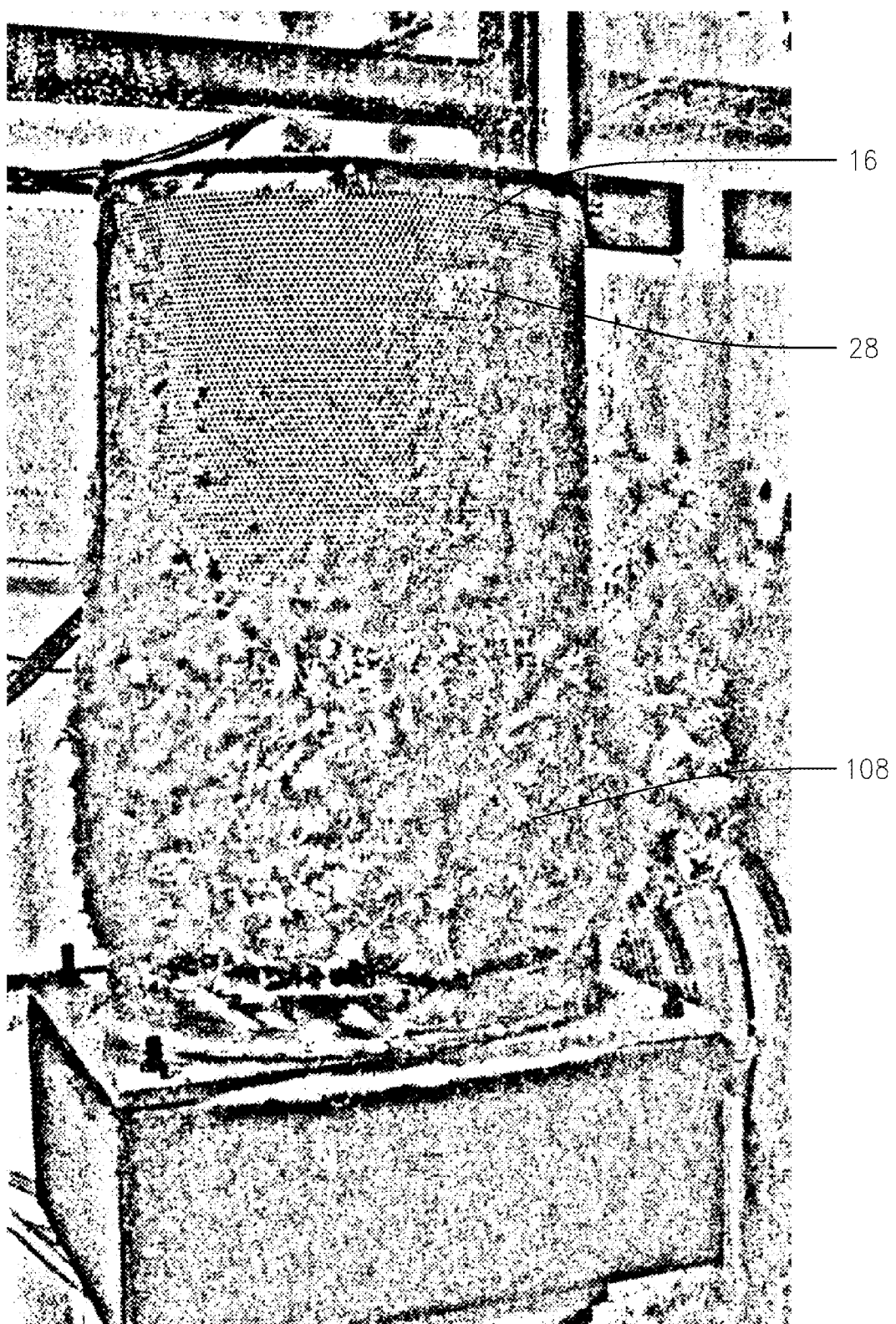
FIG. 12 is a photograph of a filter similar to FIG. 10 showing the actual non-uniform debris bed that is formed on the surfaces of the strainer module in association with the present invention.

Referring now to FIGS. 10 and 12, there is shown a diagram and a photograph, respectively, of a non-uniform debris bed 108 that is formed on the surfaces of a strainer module 16 employing a filter medium 100 of the present invention. Now compare the non-uniform debris bed 108 shown in FIGS. 10 and 12 with the more uniform debris bed 110 shown in FIG. 11. The more uniform debris bed 110 is typical of those formed on a prior art strainer module 16 that does not employ a filter medium 100 of the present invention.

The present invention enhances the non-uniform fibrous debris bed 108 or accumulation on the surface of the strainer walls 28 and 30. In addition to the secondary filtering capabilities of the present invention, the knitted woven wire mesh filter medium 100 provides internal flow resistance within the strainer module 16. The water flow path is first through the strainer wall surfaces 28 and 30, then through the filter medium 100 and finally into the general flow stream to the water suction line 60 of the emergency core cooling system. This flow path, which passes radially through the filter medium 100 along the entire length of the strainer 16, produces an increasing pressure drop of the fluid until exiting the strainer 16 into the general flow stream. This increasing pressure drop results in a varied approach velocity of the bulk fluid to the strainer surfaces 28 and 30 such that the approach velocity is higher at the base or lower edges 36 and 46 of the strainer module 16 and the approach velocity is lower at the end or upper edges 40 and 44 of the strainer module 16. This varied approach velocity of the bulk fluid results in fibrous debris accumulating in a non-uniform debris bed 108 with a pattern of a thicker debris bed accumulation at the base or lower edges 36 and 46 of the strainer module 16 and tapering to a thinner debris bed 110 at the end or upper edges 40 and 44 of the strainer module 16. This non-uniform debris bed 108 accumulation feature enhances the present invention's ability to accommodate "thin bed" fibrous debris loads to better insure acceptable strainer debris hydraulic head loss.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A method for filtering water contained in a containment sump of an emergency core cooling system of a nuclear reactor comprising the steps of:

inserting a woven or knitted, stainless steel filter medium into an interior annular space of at least one filter module, said interior annular space being between two concentric cylindrical strainer walls that are connected to a plenum box, wherein said filter module includes a circular plate attached to the innermost cylindrical strainer wall at the end closest to said plenum box, thus blocking bypassing liquid flow between the interior of said module within the inner cylindrical strainer wall and a cavity of the plenum box;

retaining said filter medium within said interior annular space;

pumping water from said containment sump sequentially through said strainer walls, said filter medium, a ring shaped opening in fluid communication with said interior annular space and said plenum cavity, and then through said plenum to produce filtered water that is substantially free of debris that would detrimentally affect downstream components; and pumping said filtered water to a reactor core.

2. The method of claim 1, wherein said filter medium is inserted into a plurality of filter modules.

3. The method of claim 1, wherein said step of retaining is accomplished using an X-shaped retainer.

4. The method of claim 1, wherein a sealing ring is attached to said filter module cylindrical walls at an end furthest from said plenum box.

* * * * *